United States Patent
Long et al.

(10) Patent No.: US 8,327,233 B2
(45) Date of Patent: Dec. 4, 2012

(54) METHOD AND DEVICE FOR TRANSMITTING AND RECEIVING DATA PACKETS

(75) Inventors: Yanbo Long, Shenzhen (CN); Xianyi Chen, Shenzhen (CN); Pulin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 12/608,457

(22) Filed: Oct. 29, 2009

(65) Prior Publication Data

US 2010/0050058 A1 Feb. 25, 2010

Related U.S. Application Data

(63) Continuation of application No. PCT/CN2008/070196, filed on Jan. 28, 2008.

(30) Foreign Application Priority Data

Apr. 29, 2007 (CN) .......................... 2007 1 0103624

(51) Int. Cl.
*H03M 13/00* (2006.01)
(52) U.S. Cl. ....................................................... 714/776
(58) Field of Classification Search .................... 714/776
See application file for complete search history.

(56) References Cited

U.S. PATENT DOCUMENTS

| | | | | |
|---|---|---|---|---|
| 6,490,705 B1 * | 12/2002 | Boyce | ............................ | 714/776 |
| 7,660,245 B1 * | 2/2010 | Luby | .............................. | 370/230 |
| 2002/0054608 A1 | 5/2002 | Wan et al. | | |
| 2002/0159454 A1 | 10/2002 | Delmas | | |
| 2004/0123211 A1 | 6/2004 | Kozintsev et al. | | |
| 2004/0261001 A1 | 12/2004 | Chang et al. | | |
| 2006/0107189 A1 * | 5/2006 | Wenger et al. | ................ | 714/776 |
| 2007/0064707 A1 * | 3/2007 | Pandel et al. | .................. | 370/394 |
| 2007/0124651 A1 * | 5/2007 | Champel | ....................... | 714/776 |
| 2008/0034273 A1 * | 2/2008 | Luby | .............................. | 714/776 |
| 2008/0134266 A1 * | 6/2008 | Kang | ............................. | 725/110 |
| 2009/0010170 A1 * | 1/2009 | Pepper et al. | ................. | 370/241 |

FOREIGN PATENT DOCUMENTS

| | | |
|---|---|---|
| CN | 1380780 A | 11/2002 |
| CN | 1509027 A | 6/2004 |
| CN | 1809963 A | 7/2006 |

(Continued)

OTHER PUBLICATIONS

Extended European Search Report in corresponding European Application No. 08706573.6 (Aug. 12, 2010).

(Continued)

*Primary Examiner* — Scott Baderman
*Assistant Examiner* — Neil Miles
(74) *Attorney, Agent, or Firm* — Leydig, Voit & Mayer, Ltd.

(57) ABSTRACT

Forward Error Correction (FEC) coding is performed on data packets to generate verifying packets; corresponding information independent of a packet sequence number (SN) and denoting a corresponding relation between the data packets and the verifying packets is carried in the data packets, or in the verifying packets, or in the data packets and the verifying packets; the data packets and the verifying packets are transmitted by using a protocol based on a User Datagram Protocol (UDP). A method for receiving data packets and devices for transmitting and receiving data packets are further described. Thus, a receiving terminal correctly can recover lost data packets after a relay device modifies the packet SN.

16 Claims, 4 Drawing Sheets

FOREIGN PATENT DOCUMENTS

| | | |
|---|---|---|
| EP | 1 755 248 A1 | 8/2005 |
| EP | 1 592 160 A1 | 11/2005 |
| WO | WO 99/30462 A2 | 6/1999 |
| WO | WO 2005/041466 A1 | 5/2005 |

OTHER PUBLICATIONS

Written Opinion of the International Searching Authority in corresponding PCT Application No. PCT/CN2008/070196 (May 8, 2008).

"G.729—Coding of speech at 8 kbit/s using conjugate-structure algebraic-code-excited linear prediction (CS-ACELP)," Series G: Transmission Systems and Media, Digital Systems and Networks—Digital terminal equipments—Coding of analogue signals by methods other than PCM, Jan. 2007, International Telecommunication Union, Geneva, Switzerland.

"H.263—Video coding for low bit rate communication," Series H: Audiovisual and Multimedia Systems, Infrastructure of audiovisual services—Coding of moving video, Jan. 2005, International Telecommunication Union, Geneva, Switzerland.

"H.264—Advanced video coding for generic audiovisual services," Series H: Audiovisual and Multimedia Systems, Infrastructure of audiovisual services—Coding of moving video, Mar. 2005, International Telecommunication Union, Geneva, Switzerland.

Rosenberg et al., "RFC 2733—An RTP Payload Format for Generic Forward Error Correction," Network Working Group, Dec. 1999, The Internet Society, Reston, Virginia.

1$^{st}$ Office Action in corresponding Chinese Patent Application No. 200710103624.6 (Mar. 26, 2012).

* cited by examiner

METHOD AND DEVICE FOR TRANSMITTING AND RECEIVING DATA PACKETS

CROSS-REFERENCE TO RELATED APPLICATIONS

This application is a continuation of International Patent Application No. PCT/CN2008/070196, filed Jan. 28, 2008, which claims priority to Chinese Patent Application No. 200710103624.6, filed Apr. 9, 2007, both of which are hereby incorporated by reference in their entireties.

FIELD OF THE TECHNOLOGY

The present invention relates to a communication field, and more particularly to a data packet transmission technology.

BACKGROUND OF THE INVENTION

With the emergence of 3rd generation (3G) mobile communication systems and the rapid development of networks based on the Internet Protocol (IP), the video communication increasingly becomes one of the main communication services, for example, bi-party or multiparty video communication services such as video phones, video conferences, and mobile terminal multimedia services.

Figure 1:
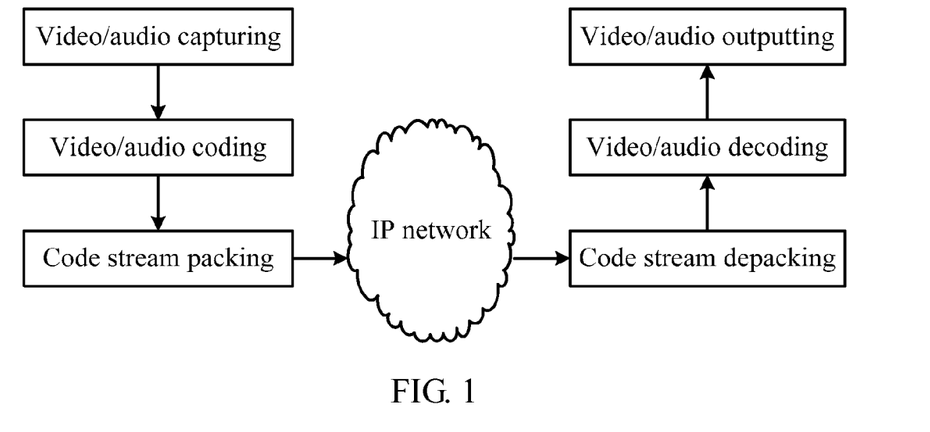
FIG. 1 is a schematic view of a typical video/audio transporting process on an IP network in the conventional technology.

During a video/audio transporting process, in order to reduce a transported data amount, an original video/audio sequence is compressed according to a certain coding algorithm (for example, H.263, H.264, or G.729), so as to obtain a code stream with different data amounts per frame. In order to be adapted to the network transportation, a packaging and fragmentation process is performed on the compressed code stream according to a certain packaging protocol, for example, the packaging and fragmentation process on the IP network is called packing. FIG. 1 shows a typical video/audio transporting process on the IP network.

After being coded and packed, one frame of an original picture is divided into a plurality of Real-time Transport Protocol (RTP) packets for transmission. In order to improve a transporting efficiency, video packets are usually transported through a User Datagram Protocol (UDP) protocol, in which the handshake and acknowledgement are not required, so the transporting efficiency is quite high. However, the video data packets may be lost easily, so that the receiving terminal cannot decode a complete picture.

In order to reduce the effect of the data packet loss on the video picture, recently many methods were proposed, which may be concluded in the following types.

(1) Compensation method based on time and space: the method is performed on the receiving terminal; when detecting the packet loss, the receiving terminal identifies the picture (voice) regions which cannot be decoded due to the packet loss, and then compensates the lost regions by using the motion compensation, linear interpolation, and other methods according to a dependency of the voice and the picture in time and space.

(2) Packet compensation method based on Forward Error Correction (FEC): in the method, the FEC algorithm is adopted on the transmitting terminal. The video/audio code stream is verified to generate verifying data, and then the video/audio data and the verifying data are transferred to the receiving terminal. After detecting the video/audio data packet loss, the receiving terminal completely recovers the lost data packets according to the verifying rule the same as that of the transmitting terminal based on the verifying data, so as to finally recover the complete picture and voice.

(3) Lost packet retransmission method: after detecting the pack loss, the receiving terminal notifies the transmitting terminal, and the transmitting terminal retransmits the lost packets.

In a current packet verifying and transporting system adopting the FEC method, in order to enable the receiving terminal to identify the data packets and the verifying packets, and identify the data packets for generating the current verifying packet, an RTP packing format of the verifying packet is regulated as follows.

Figure 2:
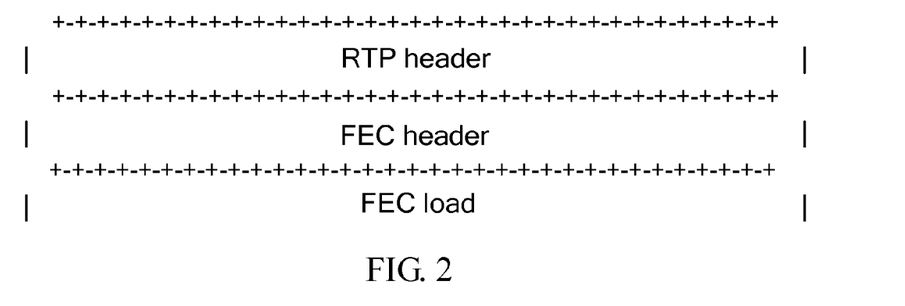
FIG. 2 is a schematic structural view of an FEC packet in the conventional technology.
Figure 3:
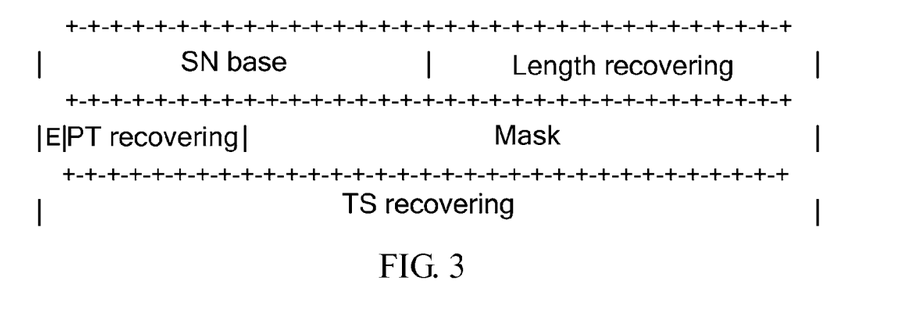
FIG. 3 is a schematic structural view of a packet header of a verifying packet in the conventional technology.

A packet header of a verifying packet and a load of the verifying packet are put into a load of the RTP packet, so as to form an FEC packet (that is, an RTP-based verifying packet), as shown in FIG. 2. A length of the packet header of the verifying packet is 12 bytes, and the format is as shown in FIG. 3. The packet header includes a sequence number (SN) base domain adapted to denote a packet SN, a length recovering domain, an E domain, a payload type (PT) recovering domain, a Mask domain, and a tag switching (TS) recovering domain.

In the packet header of the verifying packet, a value of the SN base domain must be set to a minimal packet SN in the data packets corresponding to the verifying packet, for example, if the verifying packet is generated by the data packets with the packet SNs of 12, 14, and 18, the value of the SN base domain must be set to 12. A length of the Mask domain is 24 bits; if an ith bit is set to 1, the data packet with the SN of N+i is associated with the verifying packet, that is, the data packet with the SN of N+i exists in the data packets corresponding to the verifying packet. Here, N is the value of the SN base domain, a least significant bit (LSB) is corresponding to i=0, and a most significant bit (MSB) is corresponding to i=23, so one data packet is generated by 24 data packets at most. For the above case, in the Mask domain of the packet header of the verifying packet, a 0th bit, a 2nd bit, and a 6th bit are set to 1, indicating that the data packets corresponding to the verifying packet are those with the packet SNs of 12 (12+0), 14 (12+2), and 18 (12+6).

Figure 4:
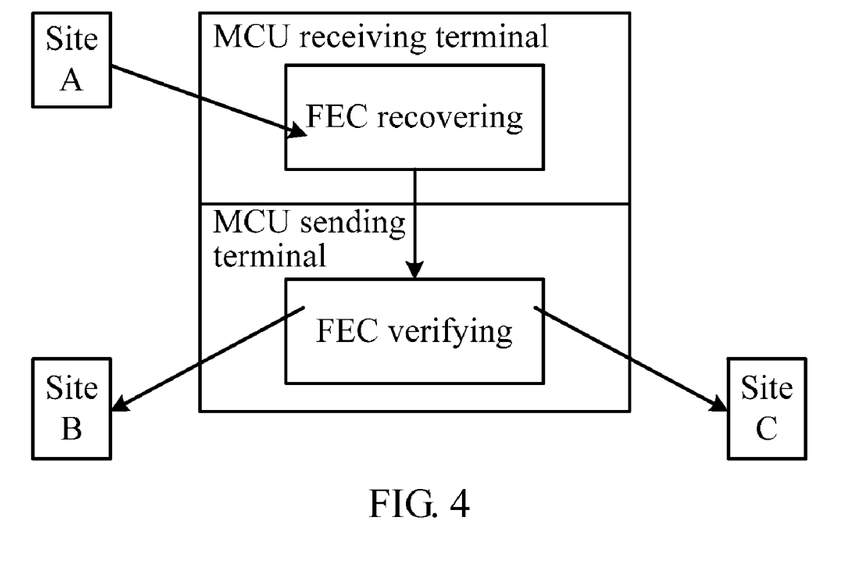
FIG. 4 is a schematic view of a process that a receiving terminal of a MCU performs a recovering operation and a transmitting terminal performs a verification again in the conventional technology.

However, the inventors of the present invention find that a corresponding relation between the verifying packet and the data packets is determined according to the SN base domain (that is, the packet SN) and the Mask domain in the verifying packet currently; however, in the multipoint video communication, a relay device, for example, a multipoint control unit (MCU) usually modifies the packet SN to ensure a continuity of the packet SN during the site switching. Therefore, the receiving terminal cannot correctly recover the corresponding relation between the verifying packet and the data packets, resulting in verification errors. In order to prevent the problem, it is necessary to perform the recovering operation on the receiving terminal of the MCU, and to perform the verification again on the transmitting terminal, as shown in FIG. 4, as a result, the load of the MCU is increased, and a matching dependency on the MCU is generated.

SUMMARY OF THE INVENTION

The present invention is directed to a method and a device for transmitting and receiving data packets, which enable a receiving terminal to correctly recover lost data packets after a relay device modifies a packet sequence number (SN).

In an embodiment, the present invention provides a method for transmitting data packets, which includes the following steps.

Forward Error Correction (FEC) coding is performed on data packets to generate verifying packets.

Corresponding information independent of a packet sequence number (SN) and denoting a corresponding relation between the data packets and the verifying packets is carried in the data packets, or the corresponding information independent of the packet SN and denoting the corresponding relation between the data packets and the verifying packets is carried in the verifying packets, or the corresponding information independent of the packet SN and denoting the corresponding relation between the data packets and the verifying packets is respectively carried in the data packets and the verifying packets.

The data packets and the verifying packets are transmitted by using a protocol based on the User Datagram Protocol (UDP).

In an embodiment, the present invention also provides a method for receiving data packets, which includes the following steps.

Data packets and verifying packets are received by using a protocol based on a UDP.

Corresponding information independent of a packet SN and denoting a corresponding relation between the data packets and the verifying packets is obtained from the received data packets, or the corresponding information independent of the packet SN and denoting the corresponding relation between the data packets and the verifying packets is obtained from the received verifying packets, or the corresponding information independent of the packet SN and denoting the corresponding relation between the data packets and the verifying packets is obtained from the received data packets and the received verifying packets.

FEC processing is performed on the received data packets and the received verifying packets according to the obtained corresponding information, so as to recover lost data packets.

In an embodiment, the present invention further provides a device for transmitting data packets, which includes a coding unit, an encapsulating unit, and a transmitting unit.

The coding unit is adapted to perform FEC coding on data packets to generate verifying packets.

The encapsulating unit is adapted to carry corresponding information independent of a packet SN and denoting a corresponding relation between the data packets and the verifying packets in the data packets, or carry the corresponding information independent of the packet SN and denoting the corresponding relation between the data packets and the verifying packets in the verifying packets generated by the coding unit, or respectively carry the corresponding information independent of the packet SN and denoting the corresponding relation between the data packets and the verifying packets in the data packets and the verifying packets generated by the coding unit.

The transmitting unit is adapted to send the data packets and the verifying packets encapsulated by the encapsulating unit by using a protocol based on the UDP.

In an embodiment, the present invention further provides a device for receiving data packets, which includes a receiving unit, an obtaining unit, and an error correction unit.

The receiving unit is adapted to receive data packets and verifying packets by using a protocol based on the UDP.

The obtaining unit is adapted to obtain corresponding information independent of a packet SN and denoting a corresponding relation between the data packets and the verifying packets from the data packets received by the receiving unit, or obtain the corresponding information independent of the packet SN and denoting the corresponding relation between the data packets and the verifying packets from the verifying packets received by the receiving unit, or obtain the corresponding information independent of the packet SN and denoting the corresponding relation between the data packets and the verifying packets from the data packets and the verifying packets received by the receiving unit.

The error correction unit is adapted to perform FEC processing on the received data packets and the received verifying packets according to the corresponding information obtained by the obtaining unit, so as to recover lost data packets.

Compared with the conventional technology, the embodiments of the present invention have the following main differences and effects.

The FEC coding is performed on the data packets to generate the verifying packets, the corresponding information independent of the packet SN and denoting the corresponding relation between the data packets and the verifying packets is carried in the data packets and/or the verifying packets, and the data packets and the verifying packets are transmitted through the protocol based on the UDP. Therefore, after the relay device such as an MCU modifies the packet SN, the receiving terminal may still obtain the corresponding relation between the data packets and the verifying packets, so as to correctly recover the lost data packets, thereby preventing a matching problem of the MCU and the terminal. Thus, the environment adaptability of an anti-packet loss function is greatly improved.

DETAILED DESCRIPTION OF THE EMBODIMENTS

In order to make the objectives, technical solutions, and advantages of the present invention more comprehensible, embodiments are described in detail below with reference to the accompanying drawings.

Figure 5:
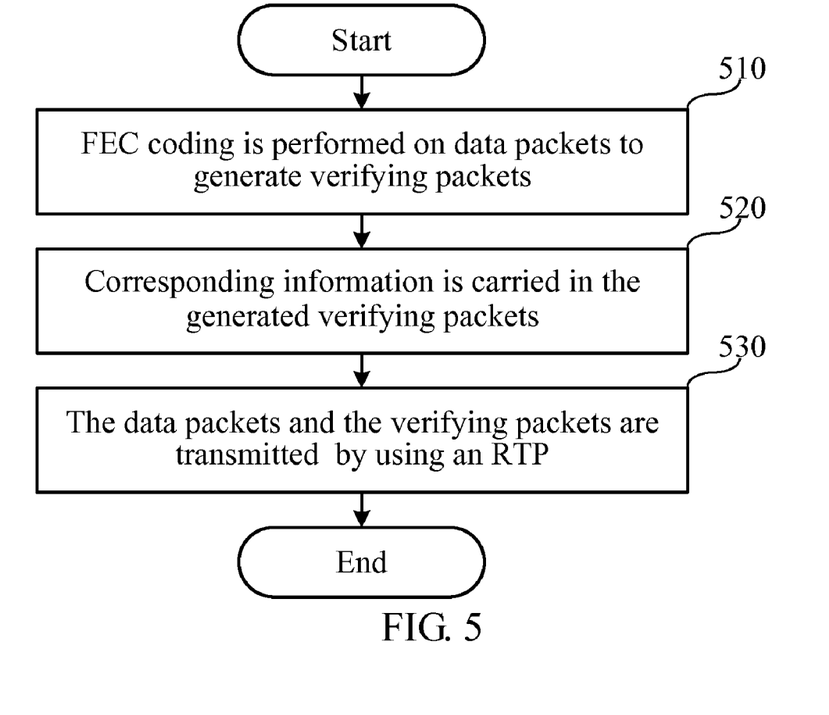
FIG. 5 is a flow chart of a method for transmitting data packets according to a first embodiment of the present invention.

A first embodiment of the present invention relates to a method for transmitting data packets. In this embodiment, by recording feature words of all data packets in a verifying group to which verifying packets belong in the verifying packets, corresponding information independent of a packet SN and denoting a corresponding relation between the data packets and the verifying packets are carried. FIG. 5 shows the specific process.

In Step 510, FEC coding is performed on data packets bearing voice and/or video data to generate verifying packets. Specifically, a transmitting terminal selects an M×N verifying matrix, and performs the FEC coding on M data packets according to the selected verifying matrix, so as to generate N verifying packets. The generated N verifying packets and the M data packets form a verifying group, in which M and N are positive integers.

Figure 6:
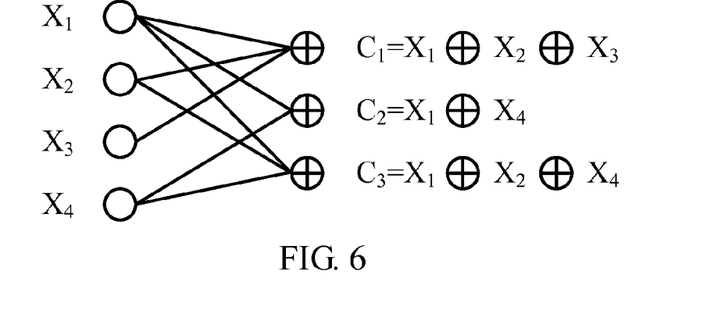
FIG. 6 is a schematic view of a generating relation between data packets and verifying packets according to the first embodiment of the present invention.

For example, the transmitting terminal selects a 4×3 verifying matrix, that is, every 4 data packets generate 3 verifying packets, so as to form a verifying group. A generating relation between the data packets and the verifying packets may be as follows. A data packet x1, a data packet x2 and a data packet x3 generate a verifying packet c1, the data packet x1 and a data packet x4 generate a verifying packet c2, and the data packet x1, the data packet x2 and the data packet x4 generate a verifying packet c3, as shown in FIG. 6.

Next, the procedure proceeds to Step 520, in which the transmitting terminal packs the generated verifying packets in an RTP format, and carries the corresponding information independent of the packet SN and denoting the corresponding relation between the data packets and the verifying packets in the generated verifying packets.

Specifically, a packet header of one verifying packet and a load of the verifying packet are put in a load of an RTP packet, so as to form an FEC packet, the packet header of the verifying packet is extended, and the corresponding information independent of the packet SN and denoting the corresponding relation between the data packets and the verifying packets is carried in the extended information. The extended information is as shown in Table 1.

TABLE 1

| SN of Verifying Matrix | Sorting SN | Amount of Effective Data Packets | Feature Word 1 | Feature Word 2 | ... | Feature Word n | Verifying Group Number |
|---|---|---|---|---|---|---|---|

The SN of the verifying matrix denotes the SN of the verifying matrix used by the verifying group to which the verifying packet belongs. By carrying the information in the packet header of the verifying packet, the M×N verifying matrix used by the verifying group to which the verifying packet belongs is uniquely determined by the receiving terminal, that is, values of M and N and a verifying relation are uniquely determined by the receiving terminal.

The sorting SN denotes the sorting SN of the verifying packet among the verifying packets in the verifying group, and is adapted to identify a position of the verifying packet. For the above case, the sorting SN of the verifying packet c1 is set to 1, the sorting SN of the verifying packet c2 is set to 2, and the sorting SN of the verifying packet c3 is set to 3.

The amount of effective data packets denotes the amount of the effective data packets in the verifying group to which the verifying packet belongs. For the above case, in the packet headers of the verifying packets c1, c2, and c3, the amount of the effective data packets is set to 4.

The feature word 1 . . . the feature word n denote the feature words of all the data packets of the verifying group to which the verifying packet belongs, the sorting of the feature word 1 . . . the feature word n is the same as a transmitting sequence of the data packets in the verifying group. The feature word of each data packet is generated by the corresponding data packet, and uniquely identifies the data packet. For example, the feature word of the data packet is obtained by calculating the checksum of the data packet and calculating a cyclic redundancy check (CRC) of the data packet. A length of the feature words may be set according to the calculation requirements.

The verifying group number denotes the verifying group number of the verifying group to which the verifying packet belongs, so that the receiving terminal knows the verifying group to which the verifying packet belongs.

For the above case, it is assumed that the verifying group number of the verifying group to which the data packet x1, the data packet x2, the data packet x3, the data packet x4, the verifying packet c1, the verifying packet c2, the verifying packet c3 belong is 9, the SN of the used 4×3 verifying matrix is 1, and a transmitting sequence of the seven packets is (x1, x2, x3, x4, c1, c2, and c3), in which x1: RTP_SN = 100  The feature word of the data packet x1 is t1.
x2: RTP_SN = 101  The feature word of the data packet x2 is t2.
x3: RTP_SN = 102  The feature word of the data packet x3 is t3.
x4: RTP_SN = 103  The feature word of the data packet x4 is t4.

In the packet headers of the verifying packet c1, the verifying packet c2, and the verifying packet c3, extended fields are set as shown in Table 2.

TABLE 2

|  | RTP_SN | SN of Verifying Matrix | Sorting SN | Amount of Effective Data Packets | Feature Word 1 | Feature Word 2 | Feature Word 3 | Feature Word 4 | Verifying Group Number |
|---|---|---|---|---|---|---|---|---|---|
| c1 | 104 | 1 | 1 | 4 | t1 | t2 | t3 | t4 | 9 |
| c2 | 105 | 1 | 2 | 4 | t1 | t2 | t3 | t4 | 9 |
| c3 | 106 | 1 | 3 | 4 | t1 | t2 | t3 | t4 | 9 |

In this way, even if the data packets and the verifying packets are forwarded by the MCU, and the RTP_SN is modified as follows:

x1: RTP_SN=562x
x2: RTP_SN=563x
x3: RTP_SN=564
x4: RTP_SN=565
c1: RTP_SN=566 c2: RTP_SN=567
c3: RTP_SN=568 the receiving terminal can still know the data packets for generating the verifying packets (that is, the data packets corresponding to the verifying packets) according to the extended information carried in the packet headers of the verifying packets. For example, for the verifying packet c1, according to the extended information carried in the packet header of the verifying packet c1, the receiving terminal knows that the verifying matrix used by the verifying group to which the verifying packet c1 belongs is the 4×3 verifying matrix, knows the generating relation between the data packets and the verifying packets in the verifying group, and knows that the verifying packet c1 is the first verifying packet in the verifying group, so as to deduce that data packets for generating the verifying packet c1 are the $1^{st}$ data packet, the $2^{nd}$ data packet, and the $3^{rd}$ data packet in the verifying group. Further, the feature words of the data packets in the verifying group are carried in sequence in the extended information in the packet header, so the receiving terminal may find the data packets corresponding to the verifying packet c1 according to the feature words of the data packets.

Next, the procedure proceeds to Step 530, in which the transmitting terminal transmits the data packets and the verifying packets by using the RTP. For the above case, the transmitting terminal transmits the data packet x1, the data packet x2, the data packet x3, the data packet x4, the verifying packet c1, the verifying packet c2, and the verifying packet c3 in sequence by using the RTP.

In this embodiment, the corresponding information denoting the corresponding relation between the data packets and the verifying packets carried in the verifying packets is independent of the packet SN, so that even if the relay device, for example, the MCU, modifies the packet SN, the receiving terminal may still obtain the corresponding relation between the data packets and the verifying packets, so as to correctly recover the lost data packets, prevent a matching problem between the MCU and the terminal, and improve the environment adaptability of an anti-packet loss function greatly.

Further, in this embodiment, only the packet headers of the verifying packets are extended, and the data packets do not need to be modified. Therefore, even if the receiving terminal does not support the data verification in this embodiment, it is only necessary to discard the verifying packets, and a normal decoding process of the data packets is not affected. Further, as long as the video/audio data in the data packets is not changed, the corresponding feature words will not be changed, so as to correctly recover the lost packets.

Figure 7:
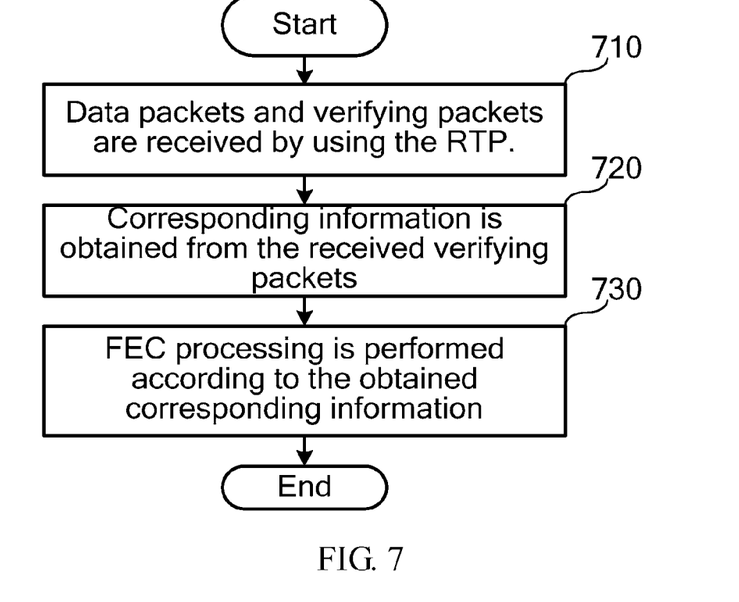
FIG. 7 is a flow chart of a method for receiving data packets according to a second embodiment of the present invention.

A second embodiment of the present invention relates to a method for receiving data packets. This embodiment is corresponding to the method for transmitting the data packets of the first embodiment. FIG. 7 shows the specific process.

In Step 710, data packets and verifying packets are received from a network by using an RTP, in which the data packets bear voice and/or video data.

Next, the procedure proceeds to Step 720, in which corresponding information independent of a packet SN and denoting a corresponding relation between the data packets and the verifying packets is obtained from the received verifying packets.

Specifically, a receiving terminal parses a packet header of a received verifying packet, and obtains a verifying group number of a verifying group to which the verifying packet belongs, an SN of the verifying matrix used by the verifying group to which the verifying packet belongs, and a sorting SN of the verifying packet among the verifying packets in the verifying group from the parsed packet header of the verifying packet, and obtains feature words of all the data packets of the verifying group to which the verifying packet belongs in sequence. Then, the data packets corresponding to the verifying packet are found according to the obtained SN of the verifying matrix, the sorting SN of the verifying packet among the verifying packets in the verifying group, and the feature words.

For the case in the first embodiment, for example, for the verifying packet c1, when receiving the verifying packet c1, the receiving terminal firstly parses a packet header of the verifying packet c1, and obtains an SN of a verifying matrix used by a verifying group to which the verifying packet c1 belongs, a sorting SN of the verifying packet c1 among the verifying packets in the verifying group, feature words of all the data packets of the verifying group to which the verifying packet c1 belongs, and other information from the parsed packet header of the verifying packet c1. Then, according to the obtained SN of the verifying matrix, it is known that the verifying matrix used by the verifying group to which the verifying packet c1 belongs is a 4×3 verifying matrix. Further, according to an obtained position of the verifying packet c1 among the verifying packets in the verifying group (the verifying packet c1 is a first verifying packet), it is known that the verifying packet c1 is generated by the 1st data packet, the 2nd data packet, and the 3rd data packet in the verifying group. Further, according to the obtained information that feature words of the data packets in the verifying group are t1, t2, t3, and t4 in sequence, it is known that the data packets corresponding to the verifying packet c1 are the data packet with the feature word of t1, the data packet with the feature word of t2, and the data packet with the feature word of t3, so as to find the data packets corresponding to the verifying packet c1.

For example, the receiving terminal receives the data packet x1, the data packet x3, the data packet x2, and the data packet x4, and generates the corresponding feature words of t1, t3, t2, and t4 in sequence according to the data packets when receiving the data packets, so that the receiving terminal may know that the data packets corresponding to the verifying packet c1 are the received data packets x1, x2, and x3 by comparing the feature word information obtained in the packet header with the feature word information generated when the data packets are received.

Next, the procedure proceeds to Step 730, in which the receiving terminal performs FEC processing on the received data packets and the received verifying packets according to the obtained corresponding information, so as to recover the lost data packets.

For example, after receiving the verifying packets and extracting extended information in the packet headers, the receiving terminal may detect whether the packets are lost or not by sorting the feature words of the received data packets according to the feature words in the extended information. For the case in the first embodiment, it is assumed that in this embodiment, the receiving terminal receives only the data packet x1 and the data packet x2, so according to the feature words carried in the verifying packet, it can be detected that the lost data packets are the data packet x3 and the data packet x4

Then, the receiving terminal recovers the lost data packets according to the obtained corresponding information of the corresponding relation between the data packets and the verifying packets. That is, the data packet x3 is recovered by using the verifying packet c1, the data packet x1, and the data packet x2, and the data packet x4 is recovered by using the verifying packet c2 and the data packet x1.

A third embodiment of the present invention relates to a method for transmitting data packets. This embodiment is approximately the same as the first embodiment, except that: in the first embodiment, by recording the feature words of all the data packets in the verifying group to which the verifying packet belongs in the verifying packet, the corresponding information independent of the packet SN and denoting the corresponding relation between the data packets and the verifying packets is carried, while in this embodiment, by inserting additional data in the data packets and verifying packets, corresponding information independent of a packet SN and denoting a corresponding relation between the data packets and the verifying packets is carried. Here, an SN of the verifying matrix used by the verifying group to which the data packet or the verifying packet belongs, and a sorting SN in the verifying group are carried in the additional data.

Figure 8:
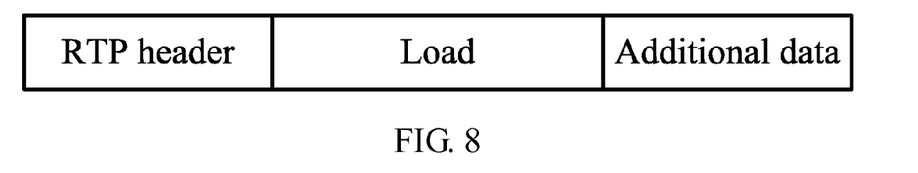
FIG. 8 is a schematic view of an RTP packing format of data packets and verifying packets in a method for transmitting data packets according to a third embodiment of the present invention.

Specifically, an RTP packing format of the data packets and the verifying packets in this embodiment is as shown in FIG. 8, and the additional data is respectively inserted in the data packets or the verifying packets. A structure of the additional data is as shown in Table 3.

TABLE 3

| SN of Verifying Matrix | Amount of Effective Data Packets | Sorting SN | Packet Type | Verifying Group Number |
| --- | --- | --- | --- | --- |

The SN of the verifying matrix denotes the SN of the verifying matrix used by the verifying group to which the data packet or the verifying packet belongs. By carrying the information in the additional data, an M×N verifying matrix used by the verifying group is uniquely determined by the receiving terminal, that is, values of M and N and a verifying relation are uniquely determined by the receiving terminal. The SN of the verifying matrix here has the same meaning as that in Table 1.

The amount of the effective data packets denotes the amount of the effective data packets in the verifying group to which the data packet or the verifying packet belongs, which has the same meaning as that in Table 1.

The sorting SN denotes the sorting SN of the data packet or the verifying packet in the verifying group, and the value thereof is [0,M+N). For example, the used verifying matrix is a 4×3 verifying matrix, and a generating relation between the data packets and the verifying packets is as shown in FIG. 6, that is, the sorting SNs of the data packet x1, the data packet x2, the data packet x3, the data packet x4, the verifying packet c1, the verifying packet c2, and the verifying packet c3 are 0, 1, 2, 3, 4, 5, and 6 respectively.

The packet type is packet type information denoting whether the current packet is a data packet or a verifying packet, so that the receiving terminal may quickly determine the packet type of the current packet according to the information.

The verifying group number denotes the verifying group number of the verifying group to which the data packet or the verifying packet belongs, so that the receiving terminal may know the verifying group to which the data packet or the verifying packet belongs. The verifying group number here has the same meaning as that in Table 1.

It is easily found that in this embodiment, by respectively inserting the additional data to the data packets and the verifying packets, the corresponding information independent of the packet SN and denoting the corresponding relation between the data packets and the verifying packets is carried. Therefore, even if a relay device such as an MCU modifies the packet SN, the receiving terminal may still obtain the corresponding relation between the data packets and the verifying packets, so as to correctly recover the lost data packets, prevent a matching problem of the MCU and the terminal, and improve environment adaptability of an anti-packet loss function greatly.

A fourth embodiment of the present invention relates to a method for receiving data packets. This embodiment is corresponding to the method for transmitting the data packets of the third embodiment, so this embodiment is approximately the same as the second embodiment, except that: in the second embodiment, the receiving terminal obtains corresponding information independent of the packet SN and denoting the corresponding relation between the data packets and the verifying packets from the received verifying packets, while in this embodiment, a receiving terminal obtains corresponding information independent of a packet SN and denoting a corresponding relation between the data packets and the verifying packets from the received data packets and the received verifying packets.

Specifically, the receiving terminal respectively parses extended additional data in a received data packet and verifying packet, and obtains a verifying group number of a verifying group to which the data packet or the verifying packet belongs, an SN of a verifying matrix used by the verifying group to which the data packet or the verifying packet belongs, and a sorting SN of the data packet or the verifying packet in the verifying group from the parsed additional data. However, according to the obtained SN of the verifying matrix, and the sorting SNs of the data packet and the verifying packet in the verifying group, the data packets corresponding to the verifying packet are found.

For example, according to the obtained SN of the verifying matrix, it is known that the verifying matrix used by the verifying group is a 4×3 verifying matrix, and a generating relation between the data packets and the verifying packets is as shown in FIG. 6. Further, according to the obtained sorting SN in the verifying group, the receiving terminal knows that the data packets corresponding to the verifying packet with the sorting SN of 4 are the data packet with the sorting SN of 0, the data packet with the sorting SN of 1, and the data packet with the sorting SN of 2. Similarly, the receiving terminal may know the data packets respectively corresponding to the verifying packet with the sorting SN of 5 or 6.

In this embodiment, the steps that the receiving terminal receives the data packets and the verifying packets from a network through the RTP, and performs the FEC processing on the received data packets and verifying packets according to the obtained corresponding information to recover the lost data packets are the same as those of the second embodiment, and are described again here.

Figure 9:
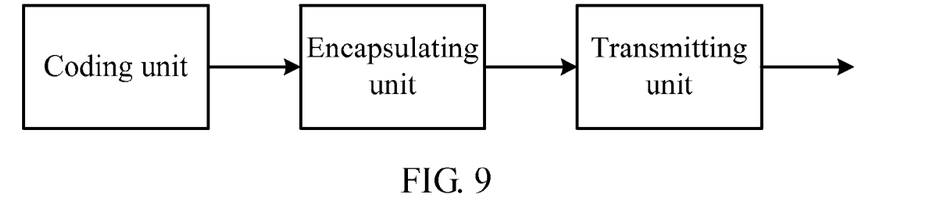
FIG. 9 is a schematic structural view of a device for transmitting data packets according to a fifth embodiment of the present invention.

A fifth embodiment of the present invention relates to a device for transmitting data packets. Referring to FIG. 9, the device includes a coding unit adapted to perform FEC coding on data packets to generate verifying packets, an encapsulating unit adapted to carry corresponding information independent of a packet SN and denoting a corresponding relation between the data packets and the verifying packets in the data packets and/or the verifying packets, and a transmitting unit adapted to transmit the data packets and the verifying packets encapsulated by the encapsulating unit by using a protocol based on a UDP, for example, an RTP.

The corresponding information denoting the corresponding relation between the data packets and the verifying packets carried in the data packets and/or the verifying packets is independent of the packet SN, so that even if a relay device such as an MCU modifies the packet SN, the receiving terminal may still obtain the corresponding relation between the data packets and the verifying packets, so as to correctly recover the lost data packets, prevent a matching problem of the MCU and the terminal, and improve an environment adaptability of an anti-packet loss function greatly.

The process that the coding unit performs the FEC coding on the data packets to generate the verifying packets is as follows: an M×N verifying matrix is selected, the FEC coding is performed on M data packets according to the selected verifying matrix, so as to generate N verifying packets; the generated N verifying packets and the M data packets form a verifying group, in which M and N are positive integers.

The encapsulating unit includes a first sub-unit and a second sub-unit, so as to carry the corresponding information independent of the packet SN and denoting the corresponding relation between the data packets and the verifying packets in the data packets and/or the verifying packets generated by the coding unit.

The first sub-unit is adapted to carry an SN of the verifying matrix used by the verifying group to which a verifying packet belongs and a sorting SN of the verifying packet among the verifying packets in the verifying group in the generated verifying packet. The second sub-unit is adapted to carry feature words of all data packets of the verifying group to which the verifying packet belongs in the verifying packet, and carry the feature words of the data packets in sequence according to a transmitting sequence of the data packets in the verifying group, in which the feature word of each data packet is generated according to the corresponding data packet, and uniquely identifies the corresponding data packet.

Alternatively, the encapsulating unit includes a third sub-unit as follows, so as to carry corresponding information independent of a packet SN and denoting a corresponding relation between data packets and verifying packets in the data packets and/or the verifying packets generated by the coding unit.

The third sub-unit is adapted to respectively carry an SN of a verifying matrix used by a verifying group to which a data packet or a verifying packet belongs and a sorting SN in the verifying group in the data packet and the verifying packet.

It should be noted that the encapsulating unit may further include a fourth sub-unit adapted to carry a verifying group number for identifying a verifying group to which a verifying packet belongs in the verifying packet, or respectively carry a verifying group number for identifying a verifying group to which a data packet or a verifying packet belongs in the data packet and the verifying packet.

In addition, it should be noted that all the units in this embodiment are logic units, and may have various different physical implementations in actual applications.

A sixth embodiment of the present invention relates to a device for receiving data packets. This embodiment is corresponding to the device for transmitting the data packets of the fifth embodiment. Specifically, referring to FIG. 10, the device includes a receiving unit adapted to receive data packets and verifying packets by using a protocol based on a UDP, an obtaining unit adapted to obtain corresponding information independent of a packet SN and denoting a corresponding relation between the data packets and the verifying packets from the data packets and/or the verifying packets received by the receiving unit, and an error correction unit adapted to perform FEC processing on the received data packets and verifying packets according to the corresponding information obtained by the obtaining unit, so as to recover the lost data packets.

Figure 10:
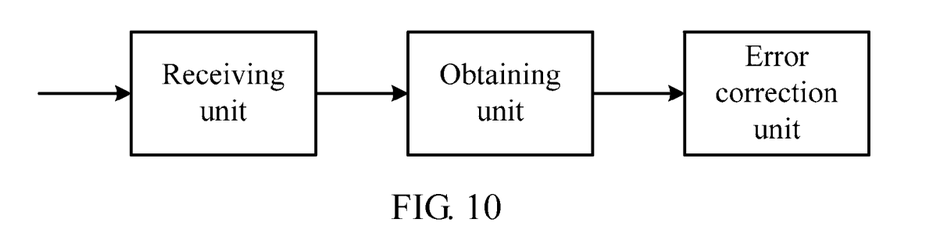
FIG. 10 is a schematic structural view of a device for receiving data packets according to a sixth embodiment of the present invention.

The obtaining unit includes a first sub-unit, a second sub-unit, and a third sub-unit as follows, so as to obtain the corresponding information independent of the packet SN and denoting the corresponding relation between the data packets and the verifying packets from the data packets and/or the verifying packets received by the receiving unit.

The first sub-unit is adapted to obtain an SN of a verifying matrix used by a verifying group to which a verifying packet belongs and a sorting SN of the verifying packet among the verifying packets of the verifying group carried in the verifying packet. The second sub-unit is adapted to obtain feature words of all the data packets of the verifying group to which the verifying packet belongs carried in the verifying packet in sequence. The third sub-unit is adapted to find the data packets corresponding to the verifying packet according to the obtained SN of the verifying matrix, the sorting SN of the verifying packet among the verifying packets in the verifying group, and the feature words.

Alternatively, the obtaining unit includes a fourth sub-unit and a fifth sub-unit as follows, so as to obtain the corresponding information independent of the packet SN and denoting the corresponding relation between the data packets and the verifying packets from the data packets and/or the verifying packets received by the receiving unit.

The fourth sub-unit is adapted to obtain an SN of a verifying matrix used by a verifying group to which a data packet or a verifying packet belongs and a sorting SN of the data packet or the verifying packet in the verifying group respectively carried in the data packet and the verifying packet. The fifth sub-unit is adapted to find the data packets corresponding to the verifying packet according to the obtained SN of the verifying matrix, and the sorting SNs of the data packet and the verifying packet in the verifying group.

It should be noted that the obtaining unit may further include a sixth sub-unit. The sixth sub-unit is adapted to obtain a verifying group number for identifying the verifying group to which the verifying packet belongs carried in the verifying packet, and output the obtained verifying group number to the first and the second sub-units. Alternatively, the sixth sub-unit is adapted to obtain the verifying group number for identifying the verifying group to which the data packet or the verifying packet belongs respectively carried in the data packet and the verifying packet, and output the obtained verifying group number to the fourth sub-unit.

In addition, it should be noted that all the units in this embodiment are logic units, and may have various different physical implementations in actual applications.

To sum up, in the embodiments of the present invention, the FEC coding is performed on the data packets to generate the verifying packets, the corresponding information independent of the packet SN and denoting the corresponding relation between the data packets and the verifying packets is carried in the data packets and/or the verifying packets, and the data packets and the verifying packets are transmitted by using the protocol based the UDP. Therefore, after the relay device such as the MCU modifies the packet SN, the receiving terminal may still obtain the corresponding relation between the data packets and the verifying packets, so as to correctly recover the lost data packets, prevent the matching problem of the MCU and the terminal, and improve the environment adaptability of the anti-packet loss function greatly.

The transmitting terminal carries the corresponding information independent of the packet SN and denoting the corresponding relation between the data packets and the verifying packets by recording the feature words of the data packets in the verifying packets, or carries the corresponding information independent of the packet SN and denoting the corresponding relation between the data packets and the verifying packets by extending the additional data in the data packets and the verifying packets. Therefore, the embodiments of the present invention may be implemented flexibly.

By recording the feature words of the data packets in the verifying packets, the data packets do not need to modified, and the corresponding information independent of the packet SN and denoting the corresponding relation between the data packets and the verifying packets can be carried by only correspondingly modifying the verifying packets. Therefore, when the receiving terminal does not support the data verification in the embodiments of the present invention, it is only necessary to discard the verifying packets, and a normal decoding process of the data packets is not affected. Further, as long as the video/audio data in the data packet is not changed, the corresponding feature words will not changed, and the lost packets can be recovered normally.

The present invention has been illustrated and described above by the preferred embodiments of the present invention. Persons of ordinary skill in the art can make modifications and variations on forms and details without departing from the spirit and scope of the present invention.

What is claimed is:

1. A method for transmitting data packets, comprising:
performing Forward Error Correction (FEC) coding on M data packets according to an M×N verifying matrix, so as to generate N verifying packets, wherein the N verifying packets and the M data packets form a verifying group, and M and N are positive integers;
transmitting the at least one data packet and the at least one verifying packet by using a protocol based on the User Datagram Protocol (UDP); wherein,
at least one of the following two kinds of packets, the at least one data packet and the at least one verifying packet, carries corresponding information independent of a packet sequence number (SN), and denoting a corresponding relation between the at least one data packet and the at least one verifying packet
wherein a verifying packet of the N verifying packets carries an SN of the verifying matrix used by the verifying group to which the verifying packet belongs and a sorting SN of the verifying packet among the N verifying packets in the verifying group; and carries feature words of the M data packets of the verifying group to which the verifying packet belongs, and carries the feature words in sequence according to a transmitting sequence of the data packets in the verifying group, wherein the feature words are generated according to the corresponding data packets, and uniquely identify the corresponding data packets.

2. The method for transmitting data packets according to claim 1, wherein the at least one data packet bears at least one of voice data and video data.

3. The method for transmitting data packets according to claim 1, wherein
a data packet of the M data packets carries an SN of the verifying matrix used by the verifying group and a sorting SN of the data packet in the verifying group; and
a verifying packet of the N verifying packets carries the SN of the verifying matrix used by the verifying group and a sorting SN of the verifying packet in the verifying group.

4. The method for transmitting data packets according to claim 1, wherein:
the verifying packet of the N verifying packets further carries a verifying group number adapted to identify the verifying group; and the data packet of the M data packets further carries the verifying group number adapted to identify the verifying group.

5. The method for transmitting data packets according to claim 1, wherein:
the verifying packet of the N verifying packets further carries a number to indicate an amount of effective data packets in the verifying group; and
the data packet of the M data packets further carries the number to indicate the amount of the effective data packets in the verifying group.

6. A method for receiving data packets, comprising:
receiving at least one data packet and at least one verifying packet by using a protocol based on the User Datagram Protocol (UDP);
obtaining corresponding information independent of a packet sequence number, SN, and denoting a corresponding relation between the at least one data packet and the at least one verifying packet from at least one of the following two kinds of packet: the at least one data packet and the at least one verifying packet; and
performing Forward Error Correction (FEC), processing on the at least one data packet and the at least one verifying packet according to the corresponding information, so as to recover lost data packets,
wherein the obtaining the corresponding information independent of the packet SN and denoting the corresponding relation between the at least one data packet and the at least one verifying packet from at least one of the following two kinds of packets: the at least one data packet and the at least one verifying packet comprises:
obtaining an SN of a verifying matrix used by a verifying group to which the at least one verifying packet belongs and a sorting SN of a verifying packet among the at least one verifying packet in the verifying group from the verifying packet;
obtaining feature words of the at least one data packet of the verifying group to which the verifying packet belongs from the verifying packet in sequence; and
searching data packets corresponding to the verifying packet according to the SN of the verifying matrix, the sorting SN of the verifying packet among the at least one verifying packet in the verifying group, and the feature words.

7. The method for receiving data packets according to claim 6, wherein the obtaining the corresponding information independent of the packet SN and denoting the corresponding relation between the at least one data packet and the at least one verifying packet from at least one of the following two kinds of packet: the at least one data packet and the at least one verifying packet comprising:
obtaining an SN of a verifying matrix used by a verifying group to which the at least one data packet belongs and a sorting SN of a data packet of the at least one data packet in the verifying group from the data packet;
obtaining an SN of a verifying matrix used by a verifying group to which the at least one verifying packet belongs and a sorting SN of verifying packet among the at least one verifying packet in the verifying group from the verifying packet; and
searching data packets corresponding to the verifying packet according to the SN of the verifying matrix used by the verifying group to which the verifying packet belongs, the sorting SN of the verifying packet in the verifying group, and the sorting SN of the data packet in the verifying group.

8. The method for receiving data packets according to claim 6, further comprising:
- obtaining a verifying group number adapted to identify the verifying group to which the verifying packet belongs from the verifying packet; and
- obtaining a verifying group number adapted to identify the verifying group to which the data packet belongs from the data packet.

9. The method for receiving data packets according to claim 7, further comprising:
- obtaining a verifying group number adapted to identify the verifying group to which the verifying packet belongs from the verifying packet; and
- obtaining a verifying group number adapted to identify the verifying group to which the data packet belongs from the data packet.

10. A device for transmitting data packets, comprising:
- a coding unit, adapted to perform Forward Error Correction (FEC) coding on at least one data packet to generate at least one verifying packet;
- an encapsulating unit, adapted to carry corresponding information independent of a packet sequence number (SN), and denoting a corresponding relation between the at least one data packet and the at least one verifying packet in at least one of the following two kinds of packet: the at least one data packet and the at least one verifying packet; and
- a transmitting unit, adapted to transmit the at least one data packet and the at least one verifying packet encapsulated by the encapsulating unit by using a protocol based on a User Datagram Protocol (UDP),
- wherein the coding unit comprises: an error correction sub-unit, adapted to perform the FEC coding on M data packets according to an M×N verifying matrix, so as to generate N verifying packets, wherein the generated N verifying packets and the M data packets form a verifying group, and M and N are positive integers,
- wherein the encapsulating unit comprises: a first sub-unit, adapted to carry an SN of the verifying matrix used by the verifying group and a sorting SN of verifying packet among the N verifying packets in the verifying group in the verifying packet output from the coding unit; and
- a second sub-unit, adapted to carry feature words of the M data packets of the verifying group to which the verifying packet belongs, and carry the feature words in sequence according to a transmitting sequence of the data packets in the verifying group in the verifying packet, wherein the feature words are generated according to the corresponding data packets, and uniquely identify the corresponding data packets.

11. The device for transmitting data packets according to claim 10, wherein the encapsulating unit comprises:
- a third sub-unit, adapted to carry an SN of the verifying matrix used by the verifying group and a sorting SN of the data packet of the M data packets in the verifying group in the data packet, and carry an SN of the verifying matrix used by a verifying group and a sorting SN of the verifying packet of the N verifying packets in the verifying group in the verifying packet output from the coding unit.

12. The device for transmitting data packets according to claim 10, further comprising:
- a fourth sub-unit, adapted to carry a verifying group number for identifying the verifying group in the verifying packet output from the encapsulating unit, and carry a verifying group number for identifying the verifying group in the data packet output from the encapsulating unit.

13. A device for receiving data packets, comprising:
- a receiving unit, adapted to receive at least one data packet and at least one verifying packet by using a protocol based on the User Datagram Protocol (UDP);
- an obtaining unit, adapted to obtain corresponding information independent of a packet sequence number (SN), and denoting a corresponding relation between the at least one the data packet and the at least one verifying packet from at least one of the following two kinds of packet: the at least one data packet and the at least one verifying packet; and
- an error correction unit, adapted to perform Forward Error Correction (FEC) processing on the at least one data packets and the at least one verifying packet according to the corresponding information obtained by the obtaining unit, so as to recover lost data packets,
- wherein the obtaining unit comprises:
- a first sub-unit, adapted to obtain an SN of a verifying matrix used by a verifying group to which the at least one verifying packet belongs and a sorting SN of verifying packet among the at least one verifying packets in the verifying group from the verifying packet received by the receiving unit;
- a second sub-unit, adapted to obtain feature words of the at least one data packet of the verifying group to which the verifying packet belongs from the verifying packet received by the receiving unit in sequence; and
- a third sub-unit, adapted to search data packets corresponding to the verifying packet received by the receiving unit according to the SN of the verifying matrix, the sorting SN of the verifying packet among the at least one verifying packet in the verifying group, and the feature words obtained by the first sub-unit and the second sub-unit.

14. The device for receiving data packets according to claim 13, wherein the obtaining unit comprises:
- a fourth sub-unit, adapted to obtain an SN of a verifying matrix used by a verifying group to which the at least one data packet belongs and a sorting SN of data packet of the at least one data packet in the verifying group from the data packet received by the receiving unit, and obtain an SN of a verifying matrix used by a verifying group to which the at least one verifying packet belongs and a sorting SN of verifying packet of the at least one verifying packet in the verifying group from the verifying packet received by the receiving unit; and
- a fifth sub-unit, adapted to search the data packets corresponding to the verifying packet according to the SN of the verifying matrix, the sorting SN of the data packet in the verifying group, and the sorting SN of the verifying packet in the verifying group obtained by the fourth sub-unit.

15. The device for receiving data packets according to claim 13, further comprising:
- a sixth sub-unit, adapted to obtain a verifying group number for identifying a verifying group to which the verifying packet belongs from the verifying packet received by the receiving unit, and output the obtained verifying group number to the obtaining unit.

16. The device for receiving data packets according to claim 13, further comprising:
- a sixth sub-unit, adapted to obtain a verifying group number for identifying a verifying group to which the data packet belongs from the data packet received by the receiving unit, obtain a verifying group number for identifying the verifying group to which the verifying packet belongs from the verifying packet received by the receiving unit, and output the verifying group number of the verifying group to which the data packet belongs and the verifying group number of the verifying group to which the verifying packet belongs to the obtaining unit.

* * * * *